(12) United States Patent
Bell

(10) Patent No.: US 11,713,994 B2
(45) Date of Patent: *Aug. 1, 2023

(54) METHOD AND SYSTEM FOR CARGO MASS ESTIMATION USING A VERTICAL ACCELEROMETER

(71) Applicant: BlackBerry Limited, Waterloo (CA)

(72) Inventor: Gordon Bell, Perth (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,610

(22) Filed: Mar. 31, 2022

(65) Prior Publication Data

US 2022/0221327 A1 Jul. 14, 2022

Related U.S. Application Data

(63) Continuation of application No. 16/149,732, filed on Oct. 2, 2018, now Pat. No. 11,320,300.

(51) Int. Cl.
*G01G 23/01* (2006.01)
*G01G 19/08* (2006.01)

(52) U.S. Cl.
CPC ........... *G01G 19/086* (2013.01); *G01G 23/01* (2013.01)

(58) Field of Classification Search
CPC ............................ G01G 23/01; G01G 19/086
See application file for complete search history.

(56) References Cited

U.S. PATENT DOCUMENTS

| 5,973,273 | A  | 10/1999 | Tal et al. |
| 6,122,846 | A  | 9/2000  | Gray et al. |
| 7,472,002 | B2 | 12/2008 | McCann |
| 2006/0293815 | A1 | 12/2006 | McCann |
| 2011/0178673 | A1 | 7/2011  | Nakanura et al. |
| 2016/0265960 | A1 | 9/2016  | Watanabe |
| 2016/0299001 | A1 | 10/2016 | Petrucelli et al. |

FOREIGN PATENT DOCUMENTS

JP 08122132 A 5/1996

OTHER PUBLICATIONS

Patent Cooperation Treaty, International Search Report for International application No. PCT/CA2019/051382 dated Dec. 11, 2019.
Patent Cooperation Treaty, Written Opinion of the International Searching Authority for International application No. PCT/CA2019/051382 dated Dec. 11, 2019.

(Continued)

*Primary Examiner* — Jamel E Williams
*Assistant Examiner* — Alex T Devito
(74) *Attorney, Agent, or Firm* — Moffat & Co

(57) ABSTRACT

A method at a sensor apparatus affixed to a transportation asset. The method includes calibrating the sensor apparatus by initiating a vertical impact at the transportation asset, measuring spring oscillation and creating a model of the transportation asset. The method further includes detecting, subsequent to the calibrating, an impact event at the sensor apparatus. The method further includes measuring spring oscillation due to the impact event at the sensor apparatus and using the measured spring oscillation in the model created during calibration to create a load mass estimate for the transportation asset.

19 Claims, 9 Drawing Sheets

(56) References Cited

OTHER PUBLICATIONS

Extended European Search Report, EP Application No. 19869833.4, dated Oct. 29, 2021.
Notice of First Office Action, Chinese Patent Application No. 201980079582.8, dated Oct. 10, 2022, pp. 1-10.
"Ship Acoustic Stealth Technology", Li Tianbao et al., Harbin Engineering University Press, Dec. 31, 2012, pp. 1-8 (pp. 1-8 of the English translation).
Search Report, Chinese Patent Application No. 2019800795828, dated Mar. 9, 2023, pp. 1-2 (pp. 1-3 of the English translation).
Office Action, Chinese Patent Application No. 2019800795828, dated Mar. 14, 2023, pp. 1-7 (pp. 1-12 of the English translation).

METHOD AND SYSTEM FOR CARGO MASS ESTIMATION USING A VERTICAL ACCELEROMETER

FIELD OF THE DISCLOSURE

The present disclosure relates to the transportation of goods, and in particular relates to cargo mass estimation of containers or trailers for the transportation of goods.

BACKGROUND

During the transportation of goods, the trailer weight is an important piece of information that a transportation company needs to know. In particular, various provinces and states have weight limits for roads, and vehicles are not allowed to exceed such maximum allowable gross weight. Further, many jurisdictions collect taxes based on the weight of transported goods, and it is therefore important for a transportation company to know the gross weight of the trailer.

Further, the information on vehicle weight may be beneficial to the transportation company itself. In particular, a transportation company managing a fleet of vehicles needs to know which vehicles are full and which vehicles are empty. One way to determine this is based on the weight of the vehicle, since a dry or empty weight of the trailer is typically a known value.

Typically, a vehicle weight is determined by the container, trailer or similar asset proceeding to a weighing station. However, such information is then only available well after the vehicle has been loaded. Further, long periods of time may exist between weighing the container, trailer or similar asset.

BRIEF DESCRIPTION OF THE DRAWINGS

The present disclosure will be better understood with reference to the drawings, in which.

DETAILED DESCRIPTION OF THE DRAWINGS

The present disclosure provides a method at a sensor apparatus affixed to a transportation asset, the method comprising: calibrating the sensor apparatus by initiating a vertical impact at the transportation asset, the calibrating measuring spring oscillation and creating a model of the transportation asset; detecting, subsequent to the calibrating, an impact event at the sensor apparatus; measuring spring oscillation due to the impact event at the sensor apparatus; and using the measured spring oscillation in the model created during calibration to create a load mass estimate for the transportation asset.

The present disclosure further provides a sensor apparatus affixed to a transportation asset, the sensor apparatus comprising: a processor; and a communications subsystem, wherein the sensor apparatus is configured to: calibrate the sensor apparatus by initiating a vertical impact at the transportation asset, the calibrating measuring spring oscillation and creating a model of the transportation asset; detect, subsequent to the calibrating, an impact event at the sensor apparatus; measurie spring oscillation due to the impact event at the sensor apparatus; and use the measured spring oscillation in the model created during calibration to create a load mass estimate for the transportation asset.

The present disclosure further provides a computer readable medium for storing instruction code, which, when executed by a processor of a sensor apparatus affixed to a transportation asset cause the sensor apparatus to: calibrate the sensor apparatus by initiating a vertical impact at the transportation asset, the calibrating measuring spring oscillation and creating a model of the transportation asset; detect, subsequent to the calibrating, an impact event at the sensor apparatus; measurie spring oscillation due to the impact event at the sensor apparatus; and use the measured spring oscillation in the model created during calibration to create a load mass estimate for the transportation asset.

In accordance with the embodiments described below, cargo mass estimation methods and systems utilizing a vertical accelerometer are described.

In the embodiments described below, the mass estimation measurements are performed on a trailer which is connected to a tractor. However, in other cases, the measurements may be made on other shipping containers, including, but not limited to, railcars, trucks, automobiles, among others.

Figure 1:
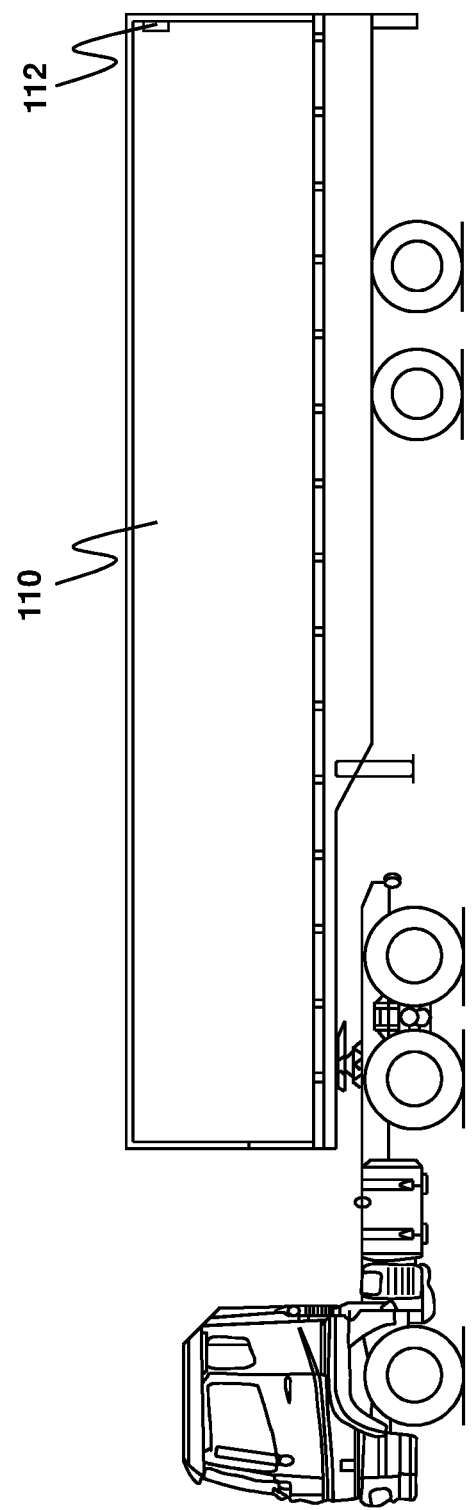
FIG. 1 is a side elevational view of a container showing an example placement of a sensor apparatus.

In order to perform mass estimation, a sensor apparatus may be affixed to a container, trailer, or other similar asset. For example, such sensor apparatus may be mounted inside of a trailer or cargo container. Reference is now made to FIG. 1.

In the embodiment of FIG. 1, example truck trailer 110 is shown. In one embodiment, the computing device may be mounted on the back of the trailer. For example, in one embodiment the computing device may be mounted close to the top of the back door or on the rear side wall near the back door of the truck trailer 110. This is shown, for example, with sensor apparatus 112 in the embodiment of FIG. 1.

The location of computing device 112 near the rear of the trailer allows for maximum sensing of kinetic energy as a result of the vehicle hitting a significant bump.

However, in other cases it may be beneficial to have a different position for the sensor apparatus. Further, in some embodiments it may be useful to have a plurality of such sensor apparatuses within the trailer 110.

The sensor apparatuses within trailer 110 may be used alone in some embodiments, or may be combined into sets of two or more sensor apparatuses and/or external sensors for load mass calculation.

Apparatus

Figure 2:
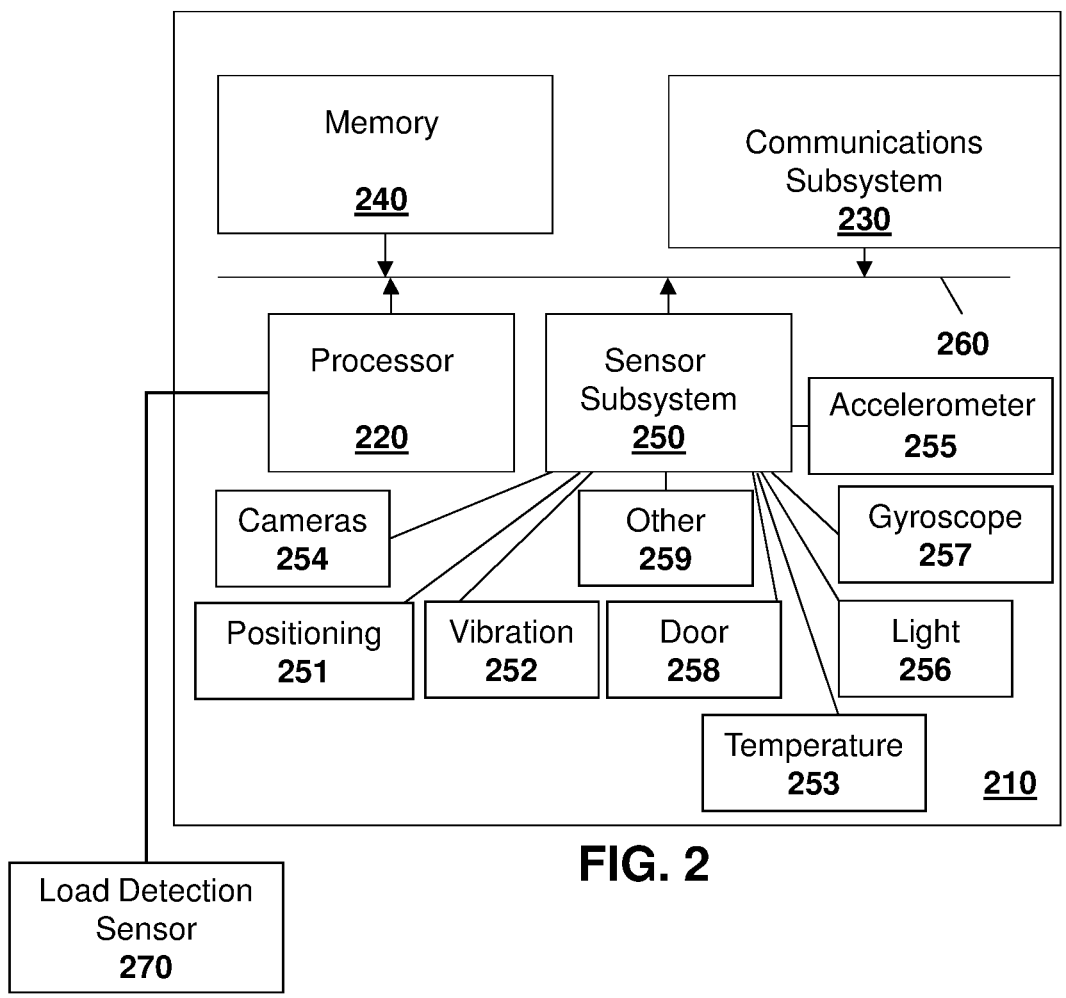
FIG. 2 is block diagram of an example sensor apparatus capable of being used between embodiments of the present disclosure.

One sensor apparatus for a vehicle or container is shown with regard to FIG. 2. The sensor apparatus of FIG. 2 is however merely an example and other sensing devices could equally be used in accordance with the embodiments of the present disclosure.

Reference is now made to FIG. 2, which shows an example sensor apparatus 210. Sensor apparatus 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the sensor apparatus 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium (not shown), for example through communications subsystem 230.

In the embodiment of FIG. 2, sensor apparatus 210 may utilize a plurality of sensors, which may either be part of sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, and other sensors 259. Other sensors may be any sensor that is capable of reading or obtaining data that may be useful for the sensor apparatus 210. However, the sensors shown in the embodiment of FIG. 2 are merely examples, and in other embodiments, different sensors or a subset of sensors shown in FIG. 2 may be used. For example, in some cases the only sensor may be an accelerometer.

Further, accelerometer 255 would typically provide acceleration sensors in three dimensions. Thus, accelerometer 255 would generally include three individual accelerometers. The readings from each of the three individual accelerometers could be isolated.

Communications between the various elements of sensor apparatus 210 may be through an internal bus 260 in one embodiment. However, other forms of communication are possible.

In the embodiment of FIG. 2, a load detection sensor 270 may be controlled by sensor apparatus 210. Load detection sensor 270 may, for example, be mounted together with sensor apparatus 210 or may form part of sensor apparatus 210. Load detection sensor 270 may be a Time of Flight (ToF) sensor, an ultrasonic sensor, an RF sensor, or may be an image sensor used to project an array of dots in any light spectrum, including visible light, ultra-violet (UV) light, or infra-red (IR) light.

Sensor apparatus 210 may be affixed to any fixed or portable platform. For example, sensor apparatus 210 may be affixed to shipping containers or truck trailers in one embodiment, as for example described above with regard to FIG. 1. In other embodiments, sensor apparatus 210 may be affixed to any vehicle for which a mass determination is needed, including self-propelled vehicles (e.g., automobiles, cars, trucks, buses, etc.), railed vehicles (e.g., trains and trams, etc.), and other types of vehicles including any combinations of any of the foregoing, whether currently existing or after arising, among others.

In other cases, sensor apparatus 210 may be part of a container that could be carried on or within a vehicle. In accordance with the present disclosure, the term container may include any sort of cargo or item transportation such as vehicles, intermodal containers, shipping bins, lock boxes, and other similar vessels.

Such a sensor apparatus 210 may be a power limited device. For example, sensor apparatus 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, sensor apparatus 210 may utilize external power, for example from the battery or power system of a tractor pulling the trailer, via a wiring harness connected to a 7-pin plug, from a land power source for example on a plugged in recreational vehicle or from a building power supply, among other options. Thus, the sensor apparatus 210 may also be connected to a power cord that receives its power from a power source.

External power may further allow for recharging of batteries to allow the sensor apparatus 210 to then operate in a power limited mode again. Recharging methods may also include other power sources, such as, but not limited to, solar, electromagnetic, acoustic or vibration charging.

The sensor apparatus from FIG. 2 may be used in a variety of environments. One example environment in which the sensor apparatus may be used is shown with regard to FIG. 3.

Figure 3:
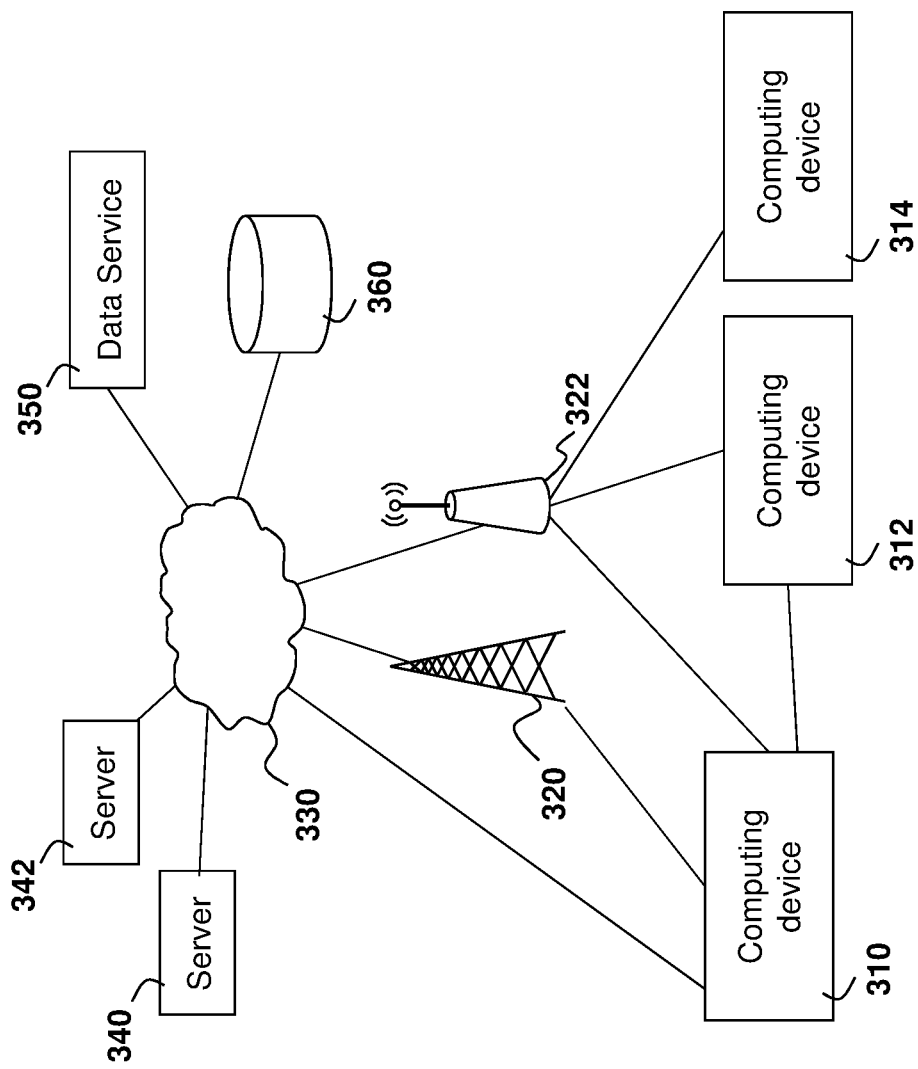
FIG. 3 is a block diagram showing an example architecture for the sensor apparatus of FIG. 2.

Referring to FIG. 3, three sensor apparatuses, namely sensor apparatus 310, sensor apparatus 312, and sensor apparatus 314 are provided.

In the example of FIG. 3, sensor apparatus 310 may communicate through a cellular base station 320 or through an access point 322. Access point 322 may be any wireless communication access point.

Further, in some embodiments, sensor apparatus 310 could communicate through a wired access point such as Ethernet or fiber, among other options.

The communication may then proceed over a wide area network such as Internet 330 and proceed to servers 340 or 342.

Similarly, sensor apparatus 312 and sensor apparatus 314 may communicate with servers 340 or server 342 through one or both of the base station 320 or access point 322, among other options for such communication.

In other embodiments, any one of sensor apparatuses 310, 312 or 314 may communicate through satellite communication technology. This, for example, may be useful if the sensor apparatus is travelling to areas that are outside of cellular coverage or access point coverage.

In other embodiments, sensor apparatus 312 may be out of range of access point 322, and may communicate with sensor apparatus 310 to allow sensor apparatus 310 to act as a relay for communications.

Communication between sensor apparatus 310 and server 340 may be one directional or bidirectional. Thus, in one embodiment sensor apparatus 310 may provide information to server 340 but server 340 does not respond. In other cases, server 340 may issue commands to sensor apparatus 310 but data may be stored internally on sensor apparatus 310 until the sensor apparatus arrives at a particular location, possibly during a particular time window. In other cases, two-way communication may exist between sensor apparatus 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor apparatuses 310, 312, 314, etc. For example, the server may be located essentially anywhere so long as it has network access to communicate with sensor apparatuses 310, 312, 314, etc.

Server 340 may, for example, be a fleet management centralized monitoring station. In this case, server 340 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading within the trailer, the mass of the trailer, among other data. The server 340 may compile such information and store it for future reference.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions, or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of sensor apparatuses 310, 312, or 314 for processing at those sensor apparatuses.

A sensor apparatus such as that described in FIGS. 2 and 3 above may be used to find the mass of a container or trailer.

Calculating the Mass of a Trailer

In accordance with some embodiments of the present disclosure, the rear segment of a transportation vehicle can be modelled as a simple spring with a mass "m" and a spring constant "k". For example, reference is now made to FIG. 4.

Figure 4:
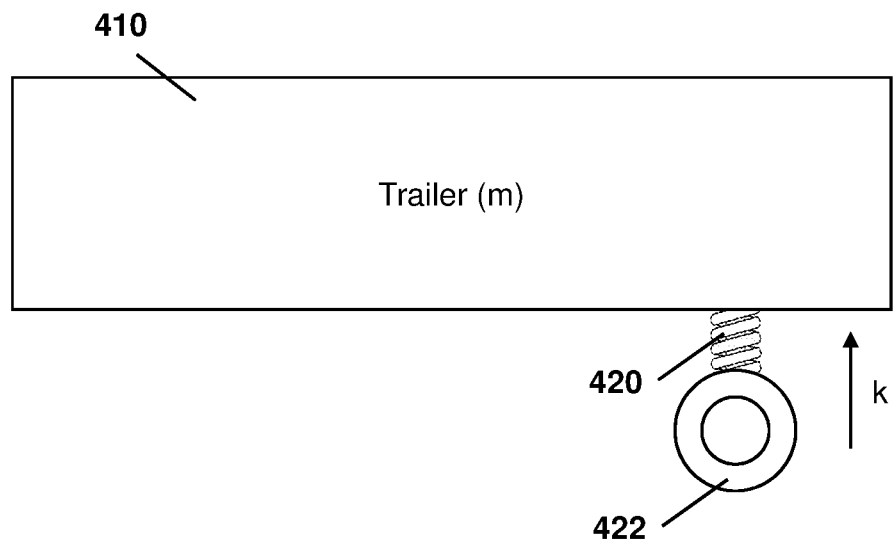
FIG. 4 is a block diagram showing a trailer acting on a spring.

In the embodiment of FIG. 4, a trailer 410 has a mass "m". An exaggerated spring 420 is shown towards the rear of the trailer and may be linked to a wheel 422, for example through an axle. The spring constant "k" of spring 420 is representative of how stiff the spring is.

Figure 5:
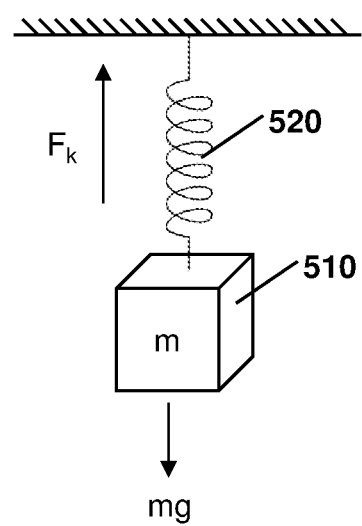
FIG. 5 is a block diagram showing the forces at the rear of a trailer or container.

The forces acting on the system of FIG. 4 are shown with regard to FIG. 5. In particular, in the embodiment of FIG. 5 a mass "m" is pulled downwards due to gravity. The acceleration due to gravity is a constant downward acceleration of "mg". The force due to a spring 520 which is not near its operating limits is "kx", where x is the spring's displacement from its rest position, and k is a constant for that particular spring.

In this circumstance, according to Hooke's law, the vibration of a simple spring is always an oscillation with a period "T", as expressed in equation 1 below.

$$T = \sqrt{m/k} \quad (1)$$

In equation 1, k is a constant value that depends on the physical characteristics of the system.

The actual motion is typically a Bessel function which decays over time with this same period. The decay of the oscillation depends on any non-linearities in the system, which may typically be dominated by the shock absorbers on the rear axles, but having some minimal impact due to air resistance and other frictions.

If a truck, trailer or other similar asset is loaded within safe operating limits, the springs on the axles should not experience any significant deformations, which may affect the period of oscillations.

The amplitude of the oscillations depends on the forces of any impacts between the wheels in the ground, but do not affect the oscillation period.

Figure 6:
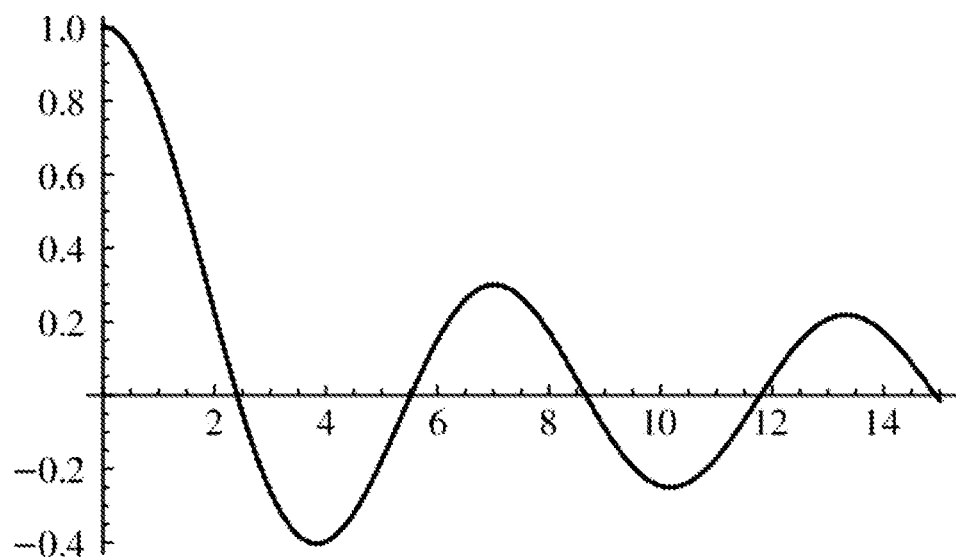
FIG. 6 is a plot of an example oscillation as seen in by and accelerometer at the rear of a trailer or container.

For example, reference is now made to FIG. 6, which shows an example plot of the magnitude of the oscillations over time. As seen from FIG. 6, the amplitude of the oscillations decreases over time. However, the period of the oscillation remains static.

Based on FIG. 6, by measuring the period of oscillation as observed by an accelerometer in the vertical direction on a container, trailer or other similar asset, an estimate could be found for the mass. The estimate may be found by comparing the oscillation period with a similar measurement taken when the same container had a known load, for example when the container is empty.

For example, the equation for the oscillation at a known load may be shown as equation 2 below.

$$T_0 = \sqrt{m_0/k} \qquad (2)$$

In equation 2 above, the period $T_0$ with known mass $m_0$ could be used in the detection of the mass increase at some later period.

For example, at some later time, after a significant impact has been detected in the container, trailer or similar asset, and after a new mass has been loaded onto the container, trailer or similar asset, the period of oscillation may be shown as that of equation 3.

$$T = \sqrt{(m+m_0)/k} \qquad (3)$$

In equation 3 above, the period of oscillation depends on the original mass (empty mass for example) along with that the mass added when the container, trailer or similar asset was loaded. Substituting for k in equation 3 gives:

$$T = T_0\sqrt{(1+m)/m_0} \qquad (4)$$

Utilizing equation 4 above, the comparing of the oscillation period T with the default oscillation period $T_0$ allows for the calculation of the new total mass $(m+m_0)$. Further, the mass added to the trailer m can be calculated since the remaining values are constant.

In practice, a real model would be more complicated than the embodiments of FIG. 4, 5, or 6, and in various embodiments described below, modelling for a more complex system is described. However, the simplified version of FIG. 4, 5, or 6, along with equations 1 to 4, may be utilized in some cases, since the motion at the back end of the vehicle would typically be dominated by the action of the rear springs acting on the rear axles.

Motion components due to forward wheels (if any), or induced from the coupling to the towing vehicle may not be significant in some cases for the very rear of vehicle where a measurement device may be attached.

In accordance with embodiments of the present disclosure, more complex modelling of systems may be done based on calibration, as described below. In particular, shock absorbers, dampers, airbags, among other items, may cause the rear axle to act as a non-simple spring. In this case, terms may be added to equations 1 to 4 to model such dampers, airbags or other items as second springs. Thus, the rear axle of a trailer may be modelled as a set of springs with a set of spring constants. In this case, the accelerometer may measure a plurality of oscillations.

A model of the series of oscillations can be calibrated for an empty load and therefore compared with the series of oscillations detected when the trailer hits a bump. In this way, a more accurate representation of the mass of the trailer may be found.

Further, in some cases, the harmonics due to the tow vehicle or front suspension may also be modelled. In particular, with enough insight as to the composition of the vehicle, the calibration as described below may further be utilized to account for such harmonics.

Also, in some cases, the model may be adapted to include other mechanical factors, such as extra axles and front axle coupling.

Calibration

As indicated above, when a sensor apparatus is first installed on a trailer or container, the system may be calibrated to allow for mass measurements on the trailer.

Figure 7:
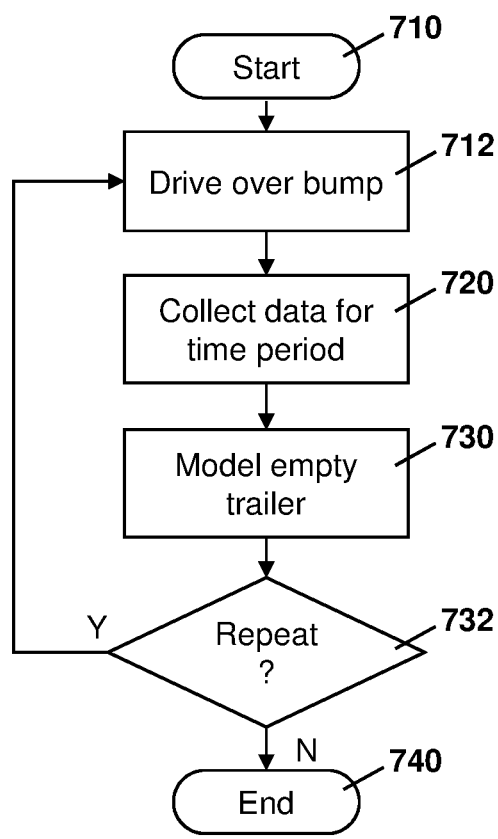
FIG. 7 is a process diagram showing a process for calibration of a sensor apparatus for mass estimation.

In particular, reference is now made to FIG. 7, which shows one example embodiment for calibrating a sensor apparatus to allow for mass measurements. The process of FIG. 7 starts at block 710 and proceeds to block 712 in which the trailer or container that the sensor apparatus is affixed to is caused to have a vertical impact. For example, in one embodiment the vertical impact may involve driving the trailer or container over a drop to initiate the spring response.

In one case, an ideal bump may be a vertical curb with a distance of approximately 6 inches or 15 cm between the top and bottom. However other distances could equally be used, and for example 3 or 4 inches (7.5 to 10 cm) may be sufficient.

From block 712 the process proceeds to block 720 in which data is collected for a threshold period of time. In one case, the oscillation observed at the vertical accelerometer may look like that shown in the FIG. 6 above. In other cases, various oscillations may be combined together in more complex systems.

From block 720, the process proceeds to block 730 in which an empty trailer is modelled. As will be appreciated by those in the art, trailers tends to be highly regulated and therefore the dry weight of the trailer would generally be known. Further, in some cases, the make and model of the trailer may be standardized and in this case the data for the dry weight of the trailer may be looked up from a database and inserted into the equations above.

If multiple oscillations are observed, then the multiple oscillations may be modelled in accordance with the embodiments described above. In particular, data about dampers, airbags, suspension, front links, among other information may be modelled based on the calibration process of FIG. 7.

Once the empty trailer model is created, the process may then proceed to block 732. At block 732, a decision may be made on whether to repeat of the calibration steps in order to fine tune the model. For example, the repeating of the calibration steps may provide a better baseline for the model created at block 730. If the process is to repeat, the process proceeds from block 732 back to block 712.

Conversely, if an accurate model has been derived then the process may proceed from block 732 to block 740 and end.

Measurement in accordance with the embodiments of the present disclosure, the mass of the trailer may be found when an impact event between the trailer and the ground occurs. For example, this impact event may occur when the truck hits a bump, from a small bump on a well travelled road to a significant pothole, when the truck drives over a curb, when a speedbump is crossed, among other options.

As indicated above, the sensor apparatus may be a power limited device. Therefore, in one embodiment, it is beneficial to avoid continuously checking for impact events and to only wake a main processor when such impact event occurs. This may save battery life on the sensor apparatus.

Figure 8:
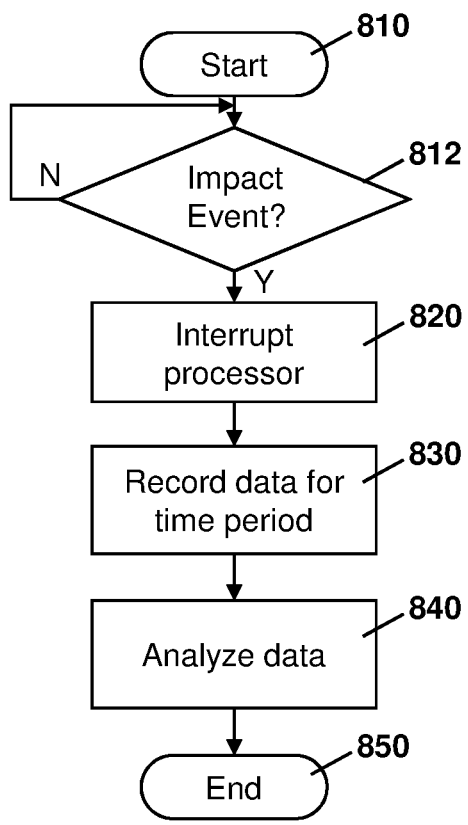
FIG. 8 is a process diagram showing a process for estimating a mass of a trailer or container load.

Reference is now made to FIG. 8, which shows a process of measuring the mass at the sensor apparatus. The process of FIG. 8 starts at block 810 and proceeds to block 812 in which a check is made to determine whether an impact event occurs. For example, the accelerometers may be very low power devices which may measure impacts. In this regard, a vertical accelerometer may be configured to provide a signal such as an interrupt to a main processor when an impact event occurs. Thus, if an impact event is sensed by an accelerometer at block 812, the process may proceed to block 820 in which the accelerometer sends an interrupt to the main processor on a sensor apparatus in order to wake the main processor. The main processor is a higher power consumption device, and is therefore only woken for short time periods.

Once the processor is woken through the interrupt a block 820, the sensor apparatus may record data received from the vertical accelerometer for a defined time period, as shown at block 830. The defined time period may be preconfigured or may be set to dynamically by a server in some cases.

The process may then proceed to block 840 in which the recorded data is analyzed to find the period of oscillation of the trailer or container after the impact. This period of oscillation may then be utilized in the formula is derived from the model during a calibration to find the mass. As indicated above, since the other elements within the formula are constants, the mass of the load may be derived based on the period of oscillation of a loaded trailer.

In some cases, the analysis of block 840 may be done at a device different from the sensor apparatus. For example, rather than analyze the data at the sensor apparatus, after the data has been recorded it may be provided to a server such as server 340 from FIG. 3. The server 340 could then analyze of the raw data to find the mass in some cases.

From block 840, the process proceeds to block 850 and ends.

The process of FIG. 8 above therefore only wakes the main processor when an impact event occurs, thereby saving battery life on the processor. Further, in some cases, the process of FIG. 8 only occurs once, for example after a threshold event such as a door closing event on the trailer has occurred. In this way, the processor is not repeatedly woken up, but rather is only woken up once per trip. In other cases, the processor may be periodically woken up, but a threshold amount of time may need to elapse between measurements in order to avoid draining the battery on the sensor apparatus.

The processor of the sensor apparatus may transition back to a sleep state once the oscillations due to the impact event are recorded and, in some cases, once the data has been analyzed.

Thus, the process of FIG. 8 is an intermittent measurement tool that allows measurements to occur once or intermittently throughout a trip.

Based on the calibration and modelling of FIGS. 7 and 8, a measurement is generally accurate for standard trucks or containers on a standard trailer.

System Degradation

The above systems and methods could provide for various enhancements for a transportation company. In one case, system degradation may be detected utilizing the techniques described above. In particular, an empty trailer should have the same oscillation pattern, for example as shown in FIG. 6, over time. If the oscillation pattern is changing over time, this could be indicative of potential failures within the trailer. For example, the springs may be degrading and may need to be replaced.

Thus, a review of the oscillation periods and/or amplitudes over an extended time period may be indicative of system degradation, which may require operator intervention.

Loss Prevention

The above systems and methods could further be utilized as part of loss prevention strategy by a transportation company. In particular, the method of FIG. 8 could be used whenever a trigger situation occurs.

Figure 9:
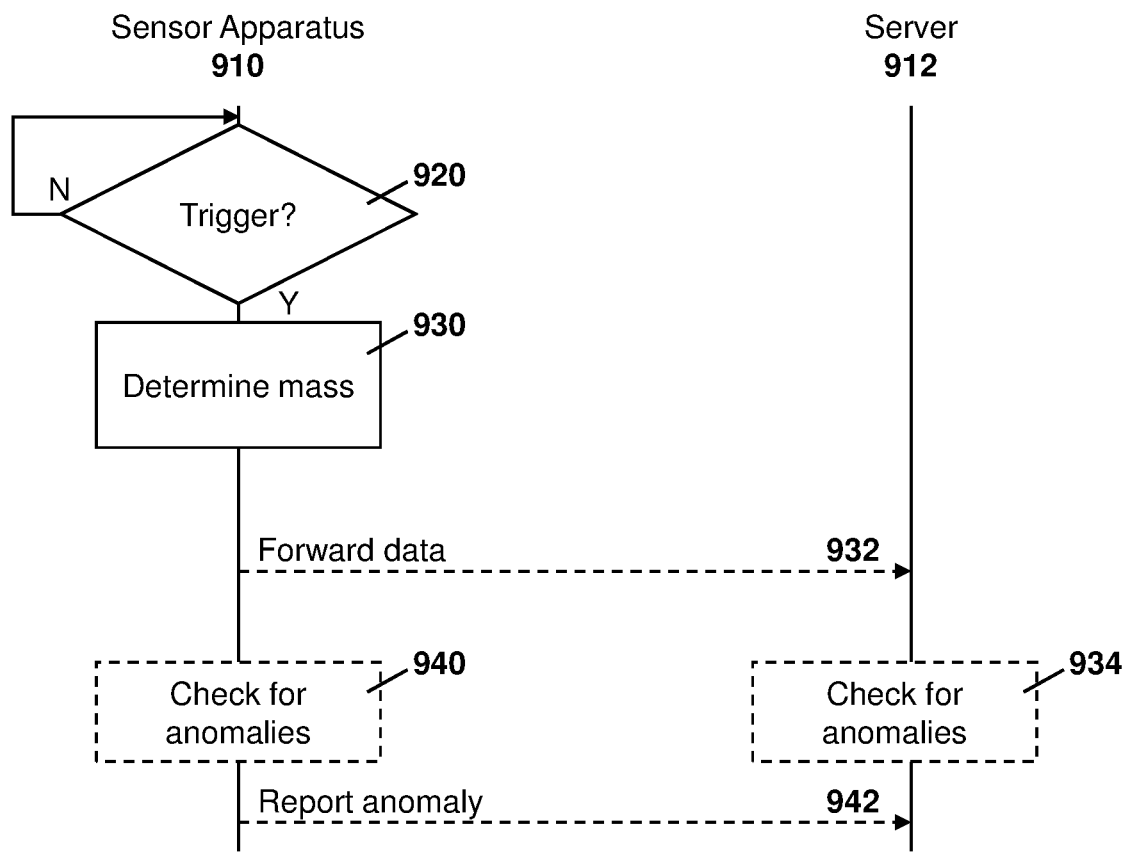
FIG. 9 is a data flow diagram showing a process for using mass estimation to detect anomalies in a shipment.

For example, reference is now made to FIG. 9. In the embodiment of FIG. 9, a sensor apparatus 910 may communicate with a server 912. At block 920, a check is made at the sensor apparatus 910 to determine whether a trigger condition has occurred.

For example, a trigger condition may be a door open or door close event. A transportation company may wish to measure the mass of the load subsequent to a door open or door close event to determine whether the mass increased or decreased and whether the door open or door close event corresponded with a loading or unloading event.

The trigger at block 920 could instead be a significant duration stop. For example, if the container or trailer is stopped for greater than a threshold period of time, a check could be made to determine whether the load mass has changed. For example, a load mass may change if the trailer was accessed by cutting a hole in the side of the trailer. In other cases, if the trailer is an open platform trailer, then a significant stop may allow for the unloading of the trailer. If the trailer is not supposed to be unloaded, then the transportation company may want to know about this.

In other cases, the trigger at block 920 could be data from a combination of sensors. For example, if the trailer is stopped and vibration is detected within the trailer, this may indicate movement within the trailer. Subsequently, when the trailer starts moving again then a load measurement may need to be taken.

Other examples of triggers at block 920 would be apparent to those skilled in the art having regard to the present disclosure.

The triggers at block 920 may be preconfigured, for example when a sensor apparatus 910 is installed or manufactured. In other cases, the triggers at block 920 may be provisioned onto the sensor apparatus, for example through server 912.

From block 920, if a trigger condition is not met, the process may continue to check for triggers at block 920.

Once a trigger condition has been detected, the process proceeds to block 930 in which a mass measurement may be taken. The mass measurement at block 930 may be taken in accordance with the embodiment of FIG. 8 above.

In one embodiment, the process may then proceed to send the mass data to a server 912, as is shown with message 932. The server 912 may then check for anomalies, as described below, at block 934.

In other cases, a check for anomalies, as shown at block 940 may be done on the sensor apparatus 910.

The check for anomalies at either block 934 or block 940 may compare the detected mass at block 930 and the expected mass. For example, transportation company will typically know when scheduled loading or unloading of the trailer or container should occur. If the mass of the trailer load changes and no scheduled loading or unloading was to occur, this could indicate an anomaly which may need to be followed up on.

In some embodiments, input may be received at a sensor apparatus on the container or trailer indicating when a scheduled loading or unloading event should occur.

From block 940, if an anomaly is detected then this may be reported to server 912, as shown by message 942.

The detection of an anomaly may cause an alert situation. For example, an operator of the transportation company may be provided with an alarm or warning indicating that an anomaly between the detected mass in the expected mass exists. Other options for actions upon anomaly detection are also possible.

Load Verification

In still further embodiments, the systems and methods described above could be used for load verification. In particular, if a sensor apparatus such as sensor apparatus 210 from FIG. 2 is used to verify a load through a time of flight sensor or other similar load measurement sensor, then the mass determination as described above could be used to verify such loading.

Load sensors such as time-of-flight sensors could be fooled if a trailer is loaded differently than expected. For example, if the time of flight sensor is at the rear of the trailer and the trailer is loaded towards its rear, leaving a significant space near the front of the trailer, a time of flight sensor would be fooled. In particular, the time of flight sensor would indicate that the trailer is completely loaded. However, the mass of the trailer would indicate that the trailer may be mostly empty.

Thus, the correlation of the mass detection and load detection systems can be used for verification of the load status.

Based on the above, a mass estimation system and method are provided in which a sensor apparatus having a vertical accelerometer may be calibrated to model an empty trailer. Subsequently, an impact event may be detected, and the sensor apparatus may, for a defined period of time, obtain data from the vertical accelerometer. Such data may be analyzed to determine a period of oscillation and to apply such period of oscillation to formulas for the model derived during calibration.

In some cases, the mass estimated based on such measurements may then be compared with expected to data to find anomalies or deterioration within the trailer or container.

A server such as servers 340, 342 or 350 may be any network node. For example, one simplified server that may perform the embodiments described above is provided with regards to FIG. 10.

Figure 10:
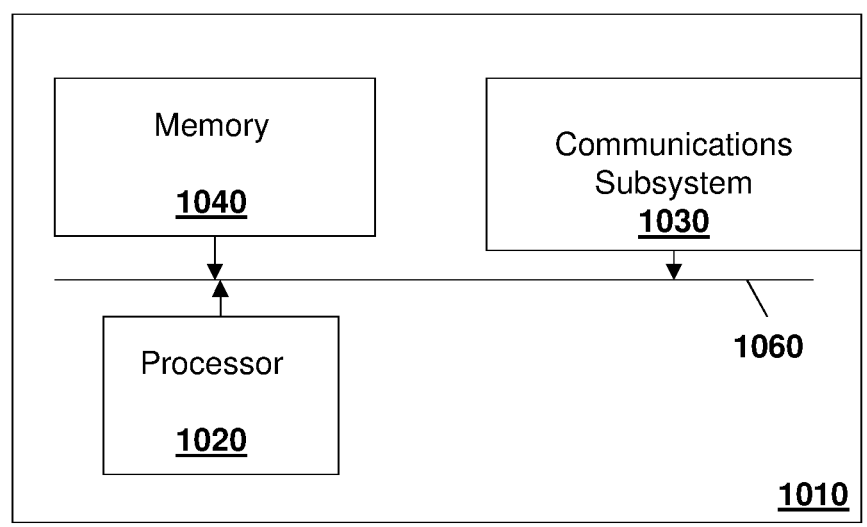
FIG. 10 is a block diagram of an example computing device or server capable of being used with the embodiments of the present disclosure.

In FIG. 10, server 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the server 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the server 1010 may access data or programmable logic from an external storage medium, for example through the communications subsystem 1030.

The communications subsystem 1030 allows the server 1010 to communicate with other devices or network elements.

Communications between the various elements of the server 1710 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a sensor apparatus affixed to a transportation asset, the method comprising:
    calibrating the sensor apparatus by initiating a vertical impact at the transportation asset, the calibrating measuring spring oscillation and creating a model of the transportation asset;
    detecting, subsequent to the calibrating, an impact event at the sensor apparatus;
    measuring spring oscillation due to the impact event at the sensor apparatus; and
    using the measured spring oscillation in the model created during calibration to create a load mass estimate for the transportation asset;
    wherein initiating the vertical impact comprises driving the transportation asset while empty over a vertical curb, the vertical curb having a length of at least three inches.

2. The method of claim 1, wherein the measuring comprises:
    sending a signal from a vertical accelerometer in the sensor apparatus to wake a processor of the sensor apparatus; and
    recording, using the processor of the sensor apparatus, oscillations detected by the vertical accelerometer.

3. The method of claim 2, wherein the recording is for a predetermined time period.

4. The method of claim 1, wherein the method further comprises, prior to the measuring, determining that a trigger condition for the measuring exists.

5. The method of claim 4, wherein the trigger condition is one or more of: a door open event; a door close event; a threshold time period elapsing from a previous oscillation measurement; or a threshold time period in which the transportation asset is stationary.

6. The method of claim 1, wherein the calibrating creates a model with a plurality of oscillations based on one or more of: dampers; shock absorbers; air bags; multiple axles; or tractor coupling.

7. The method of claim 1, wherein the calibrating uses an empty transportation asset mass entered into or looked up by the sensor apparatus.

8. The method of claim 1, further comprising:
    using the measured spring oscillation over a time period to detect deterioration of components within the transportation asset.

9. The method of claim 1, further comprising comparing the load mass estimate with an expected load mass to determine anomalies.

10. A sensor apparatus affixed to a transportation asset, the sensor apparatus comprising:
    a processor;
    an accelerometer; and
    a communications subsystem,
    wherein the sensor apparatus is configured to:
        calibrate the sensor apparatus by measuring spring oscillation during a vertical impact at the transportation asset, the calibrating creating a model of the transportation asset;
        using the accelerometer, detect, subsequent to the calibrating, an impact event at the sensor apparatus;
        wake the processor of the sensor apparatus upon detecting the impact event;
        measure spring oscillation due to the impact event at the sensor apparatus;
        use the measured spring oscillation in the model created during calibration to create a load mass estimate for the transportation asset; and
        after the creation of the load mass estimate, return the processor to a sleep state;
    wherein the vertical impact is created by driving the transportation asset while empty over a vertical curb, the vertical curb having a length of at least three inches.

11. The sensor apparatus of claim 10, wherein the sensor apparatus is configured to measure by:
    recording, using the processor of the sensor apparatus, oscillations detected by the vertical accelerometer.

12. The sensor apparatus of claim 11, wherein the sensor apparatus is configured to record is for a predetermined time period.

13. The sensor apparatus of claim 10, wherein the sensor apparatus is further configured to, prior to measuring, determine that a trigger condition for the measuring exists.

14. The sensor apparatus of claim 13, wherein the trigger condition is one or more of: a door open event; a door close event; a threshold time period elapsing from a previous oscillation measurement; or a threshold time period in which the transportation asset is stationary.

15. The sensor apparatus of claim 10, wherein the sensor apparatus is configured to calibrate by creating a model with a plurality of oscillations based on one or more of: dampers; shock absorbers; air bags; multiple axles; or tractor coupling.

16. The sensor apparatus of claim 10, wherein the sensor apparatus is configured to calibrate using an empty transportation asset mass entered into or looked up by the sensor apparatus.

17. The sensor apparatus of claim 10, wherein the sensor apparatus is further configured to:
    use the measured spring oscillation over a time period to detect deterioration of components within the transportation asset.

18. The sensor apparatus of claim 10, wherein the sensor apparatus is further configured to compare the load mass estimate with an expected load mass to determine anomalies.

19. A non-transitory computer readable medium for storing instruction code, which, when executed by a processor of a sensor apparatus affixed to a transportation asset cause the sensor apparatus to:
- calibrate the sensor apparatus by measuring spring oscillation during a vertical impact at the transportation asset, the calibrating creating a model of the transportation asset;
- using an accelerometer of the sensor apparatus, detect, subsequent to the calibrating, an impact event at the sensor apparatus;
- wake the processor of the sensor apparatus upon detecting the impact event;
- measure spring oscillation due to the impact event at the sensor apparatus;
- use the measured spring oscillation in the model created during calibration to create a load mass estimate for the transportation asset; and
- after the creation of the load mass estimate, return the processor to a sleep state;
- wherein the vertical impact is created by driving the transportation asset while empty over a vertical curb, the vertical curb having a length of at least three inches.

* * * * *